E. F. ANDERSON.
STRIPPER HARVESTER.
APPLICATION FILED NOV. 28, 1913.
1,219,211.
Patented Mar. 13, 1917.
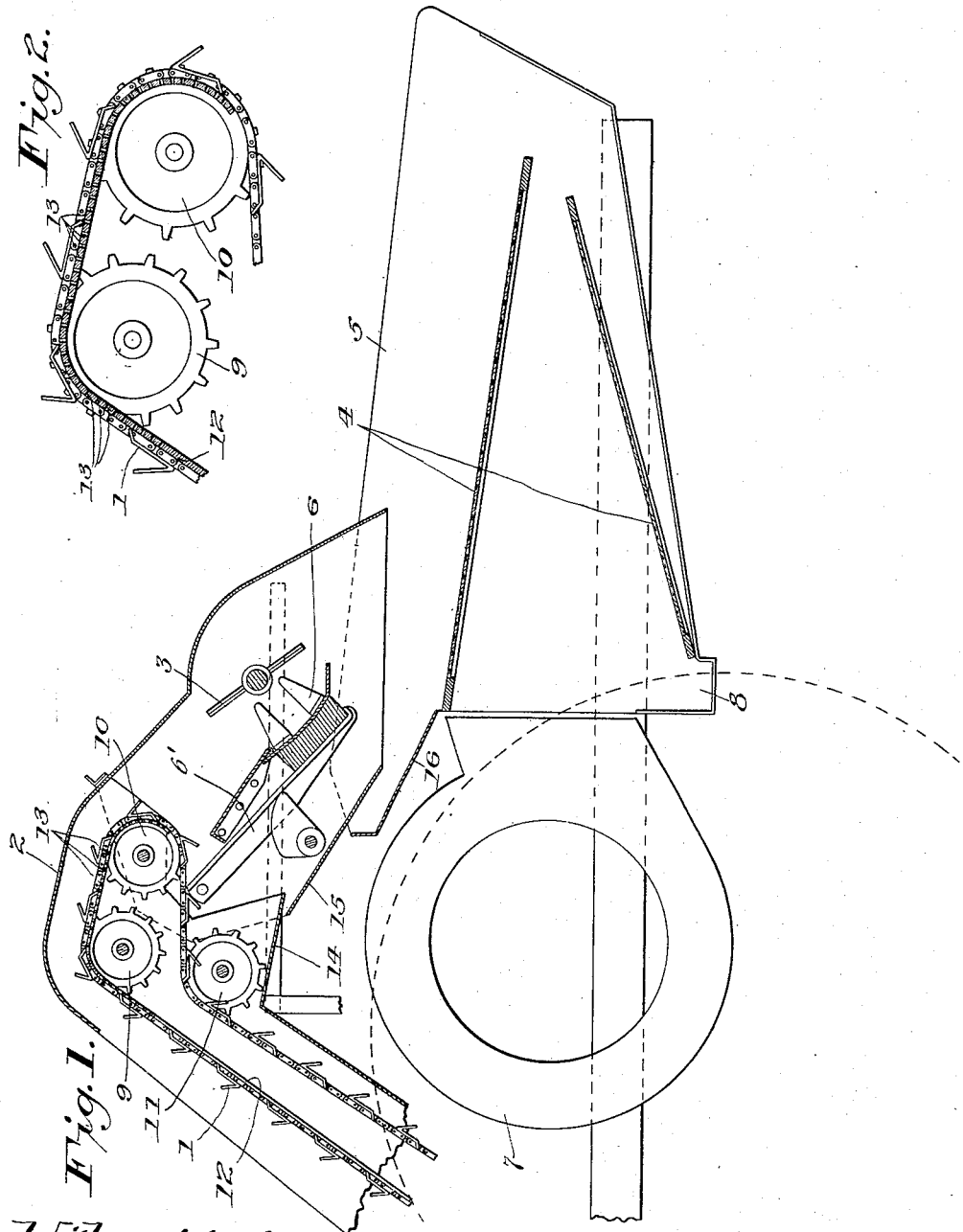
Witnesses:
Inventor:
Emil F. Anderson,
By
Atty.

UNITED STATES PATENT OFFICE.

EMIL F. ANDERSON, OF CHICAGO, ILLINOIS, ASSIGNOR TO INTERNATIONAL HARVESTER COMPANY OF NEW JERSEY, A CORPORATION OF NEW JERSEY.

STRIPPER-HARVESTER.

1,219,211. Specification of Letters Patent. Patented Mar. 13, 1917.

Application filed November 28, 1913. Serial No. 803,501.

*To all whom it may concern:*

Be it known that I, EMIL F. ANDERSON, a citizen of the United States, residing at Chicago, in the county of Cook and State of Illinois, have invented certain new and useful Improvements in Stripper-Harvesters, of which the following is a full, clear, and exact specification.

My invention relates to stripper harvesters.

It has for its object to reduce the power required to operate the peg drum of such a harvester, to minimize the breaking and cracking of the grain by the peg drum, and to increase the capacity of the machine. I attain these objects by providing improved means associated with the peg drum elevator shunting around the peg drum the threshed grain on said elevator and delivering it to the grain screens of the stripper.

In the accompanying drawings I have illustrated one embodiment which my invention may assume in practice, using the same as a means of disclosing the principle of my invention.

Figure 1 is a partial longitudinal sectional view of a stripper equipped with my improvement;

Fig. 2 is a detail view showing my improved construction in section.

The stripper shown is of standard construction, comprising a conveyer 1 movable in a suitable casing 2 and delivering the grain to a peg drum 3, which in turn delivers the grain to screens 4 in a movable grain shoe 5, a suitable toothed concave 6 which is carried on an adjustable inclined floor 6' coöperating with the peg drum in threshing the grain, and a suitable fan inclosed in a fan casing 7 acting upon the grain as it falls through the screens on its way to a grain outlet 8 provided at the bottom of the shoe.

The conveyer 1 is shown to be of the flexible chain driven type, being so connected to a plurality of sprockets 9, 10 and 11 that its upper end extends upward and rearward over the sprocket 9, slightly downward and beneath the sprocket 10, and forward again over the sprocket 11, the latter acting as a guiding sprocket. The conveyer moves over a suitable sheet metal strip, or sheeting 12, attached to the conveyer casing 2, which conforms to the shape of the path of the conveyer and is of the same width as the conveyer, the upper section of this strip being provided with suitable grain openings, or perforations, as shown at 13, from a point substantially opposite the bottom of the sprocket 9, around over the sprockets 10 and 11, and down to a point adjacent the sprocket 10, and on the peg drum side, in such a manner that as the grain threshed out by the stripper mechanism is carried up by the conveyer, this grain falls downward through the perforations 13 in the sheeting prior to the time that it is delivered to the peg drum, the grain falling upon downwardly deflecting surfaces 14 and 15 formed on the conveyer and peg drum casings, respectively, beneath the sprocket 11 and the concave support, and being deflected by these surfaces upon a sloping surface 16 on the fan end of the shoe 5, which delivers the grain upon the upper screen 4.

It is apparent that in this construction the threshed grain will thus be diverted from the peg drum, a shunt around the latter being formed so that the amount of material fed thereto is reduced by an amount equal to the amount of threshed grain carried up by the conveyer, with the result that the power required to operate the peg drum is reduced, the breaking of the grain thereby is minimized, and the capacity of the peg drum and machine is increased, since the peg drum is thus able to operate on a larger quantity of heads delivered by the conveyer 1.

While I have in this application described one embodiment of my invention, it is, of course, to be understood that I intend to cover herein all such modifications thereof as fall within the spirit of my invention and will be apparent to those skilled in the art.

What I claim as my invention, and desire to secure by Letters Patent, is:

1. In a harvester thresher, a conveyer, a thresher receiving material therefrom, a screen disposed beneath the delivery end of said conveyer, a grain shoe, a screen thereon, and means including chutes delivering directly to the screen on said shoe the loose grain carried by said conveyer and falling through the screen beneath the same.

2. In a harvester thresher, a conveyer, thresher mechanism receiving material therefrom, a screen disposed beneath the delivery end of said conveyer, conveyer and separator casings, and overlapping chute members carried thereon disposed beneath the delivery end of said conveyer and said thresher mechanism and delivering the loose grain to said separator casing.

3. In a harvester thresher, an inclined conveyer having a relatively horizontal delivery portion, a thresher receiving material therefrom, a separator screen, a screen disposed beneath the horizontal portion of said conveyer, and a chute disposed beneath said last mentioned screen delivering the loose grain falling therethrough to said separator screen.

4. In a stripper harvester, a peg drum, a conveyer delivering material thereto, a plurality of substantially horizontally disposed spaced rotating members over which said conveyer moves to a point adjacent said peg drum, a screen extending beneath said conveyer and beneath said rotating members and grain delivery means disposed beneath said rotating members and said peg drum.

5. In a stripper harvester, a peg drum, a conveyer delivering material thereto, a plurality of spaced rotating members over which said conveyer moves in a substantially horizontal plane to a point adjacent said peg drum, a screen beneath said conveyer extending under the same and between said rotating members, a separator screen, and means beneath said rotating members and said peg drum delivering to said separator screen the grain falling through said first mentioned screen.

6. In a harvester thresher, a conveyer having a substantially horizontal delivery portion, a thresher receiving material therefrom, a movable grain shoe, a separator screen thereon, a screen disposed beneath the horizontal portion of said conveyer, a chute disposed beneath said last mentioned screen and thresher, and a chute on said movable shoe receiving the grain from said first mentioned chute.

7. In a stripper harvester, a peg drum, a conveyer delivering material to said peg drum, a plurality of spaced rotating members over which said conveyer moves in a substantially horizontal plane to a point adjacent said peg drum, a screen beneath said conveyer extending under the same and between said rotating members, a separator shoe, a separator screen, and a chute comprising a plurality of overlapping sections disposed beneath said conveyer, said rotating members and said peg drum, delivering material falling through said conveyer screen to said separator screen.

In testimony whereof I affix my signature, in the presence of two witnesses.

EMIL F. ANDERSON.

Witnesses:
WILLIAM CLARK,
ALBERT W. TEUFEL.

Copies of this patent may be obtained for five cents each, by addressing the "Commissioner of Patents, Washington, D. C."